United States Patent
Cai et al.

(10) Patent No.: US 11,616,369 B2
(45) Date of Patent: Mar. 28, 2023

(54) CONTROL METHOD FOR A PARALLEL MMC UNIT OF A LCC-MMC HYBRID CASCADE CONVERTER STATION

(71) Applicants: STATE GRID JIANGSU ELECTRIC POWER CO., LTD., Nanjing (CN); STATE GRID JIANGSU ELECTRIC POWER CO., LTD. ECONOMIC RESEARCH INSTITUTE, Nanjing (CN); STATE GRID JIANGSU ELECTRIC POWER DESIGN CONSULTING INSTITUTE CO., LTD., Nanjing (CN); STATE GRID CORPORATION OF CHINA, Beijing (CN); STATE GRID JIANGSU ELECTRIC POWER CO., LTD. MARKETING CENTER, Nanjing (CN)

(72) Inventors: Hui Cai, Nanjing (CN); Zhenjian Xie, Nanjing (CN); Zhuyi Peng, Nanjing (CN); Feifei Zhao, Nanjing (CN); Xingning Han, Nanjing (CN); Caixuan Xu, Nanjing (CN); Chengchen Huang, Nanjing (CN); Zheng Xu, Nanjing (CN); Ming Yan, Nanjing (CN); Zheren Zhang, Nanjing (CN); Wanchun Qi, Nanjing (CN); Wenjia Zhang, Nanjing (CN); Wentao Sun, Nanjing (CN); Chen Li, Nanjing (CN); Quanquan Wang, Nanjing (CN); Boliang Liu, Nanjing (CN)

(73) Assignees: STATE GRID JIANGSU ELECTRIC POWER CO., LTD., Nanjing (CN); STATE GRID JIANGSU ELECTRIC POWER CO., LTD. ECONOMIC RESEARCH INSTITUTE, Nanjing (CN); STATE GRID JIANGSU ELECTRIC POWER DESIGN CONSULTING INSTITUTE CO., LTD., Nanjing (CN); STATE GRID CORPORATION OF CHINA, Beijing (CN); STATE GRID JIANGSU ELECTRIC POWER CO., LTD. MARKETING CENTER, Nanjing (CN)

( * ) Notice: Subject to any disclaimer, the term of this patent is extended or adjusted under 35 U.S.C. 154(b) by 4 days.

(21) Appl. No.: 17/061,343

(22) Filed: Oct. 1, 2020

(65) Prior Publication Data
US 2021/0143754 A1     May 13, 2021

(30) Foreign Application Priority Data
Nov. 7, 2019    (CN) .......................... 201911082067.3

(51) Int. Cl.
*H02J 3/36*     (2006.01)
*H02M 1/00*     (2006.01)

(52) U.S. Cl.
CPC ............. *H02J 3/36* (2013.01); *H02M 1/0095* (2021.05)

(58) Field of Classification Search
CPC ...... H02J 3/36; H02M 1/0095; H02M 7/4835; H02M 7/7575
See application file for complete search history.

(56) References Cited

U.S. PATENT DOCUMENTS 8,867,241 B2 * 10/2014 Asplund .................. H02J 3/36
                                                    363/35
9,515,565 B2 * 12/2016 Gupta ................. H02M 1/0095
(Continued)

FOREIGN PATENT DOCUMENTS

| CA | 3028231 A1   | 6/2019 |
| CN | 103178539 A  | 6/2013 |

(Continued)

OTHER PUBLICATIONS

X. Li et al., "Study on Main Circuit Configuration and Control Modes for a New LCC-MMC Hybrid HVDC System," 2019 IEEE PES Asia-Pacific Power and Energy Engineering Conference (APPEEC), 2019, pp. 1-5, doi: 10.1109/APPEEC45492.2019.8994570. (Year: 2019).*

(Continued)

*Primary Examiner* — Fred E Finch, III
(74) *Attorney, Agent, or Firm* — ArentFox Schiff LLP

(57) ABSTRACT

Provided is a control method for a parallel MMC unit of a LCC-MMC hybrid cascade converter station. The control strategy includes: 1) numbering all MMC units connected in parallel in a MMC valve manifold; (2) for a MMC unit using a constant direct-current voltage control manner, calculating a direct-current instruction value of the MMC unit according to a direct-current measurement value; (3) for a MMC unit using a constant active power control manner, calculating an active power instruction value of the MMC unit according to the rated capacity of the MMC unit and a direct-current instruction value of a system rectifier station; (4) for the MMC unit using the constant direct-current voltage control manner, correcting a direct-current voltage instruction value of the MMC unit by using the direct-current instruction value and the direct-current measurement value, and controlling the MMC unit according to the corrected direct-current voltage instruction value.

6 Claims, 4 Drawing Sheets

(56) References Cited

U.S. PATENT DOCUMENTS

| | | | |
|---|---|---|---|
| 9,602,021 B2* | 3/2017 | Chaudhuri | H02J 3/36 |
| 2014/0146582 A1* | 5/2014 | Gupta | H02J 3/36 |
| | | | 363/35 |
| 2015/0145252 A1* | 5/2015 | Lin | H02M 7/25 |
| | | | 290/44 |
| 2017/0331390 A1* | 11/2017 | Xu | H02M 5/4585 |
| 2021/0165034 A1* | 6/2021 | Lu | G01R 31/263 |

FOREIGN PATENT DOCUMENTS

| | | | |
|---|---|---|---|
| CN | 105634257 A | | 6/2016 |
| CN | 107994597 A | * | 5/2018 |
| CN | 108829989 A | | 11/2018 |
| CN | 109617112 A | | 4/2019 |
| CN | 110311400 A | * | 10/2019 |

OTHER PUBLICATIONS

F. Xu et al., "Control of hybrid tripole HVDC based on LCC and F-MMC," 2014 IEEE PES T&D Conference and Exposition, 2014, pp. 1-5, doi: 10.1109/TDC.2014.6863557. (Year: 2014).*

Chinese Office Action dated Nov. 16, 2021, Chinese Application No. 202011165213.1, international filing date Oct. 27, 2020. 10 pages.

Xu Zheng et al., Inverter Station Connection Modes and Control Strategies of LCC-MMC Hybrid HVDC Systems, Electric Power Construction, Jul. 2018, vol. 39 No. 7, China Academic Journal Electronic Publishing House.

* cited by examiner

CONTROL METHOD FOR A PARALLEL MMC UNIT OF A LCC-MMC HYBRID CASCADE CONVERTER STATION

CROSS-REFERENCE TO RELATED APPLICATIONS

This application claims priority to Chinese patent application No. CN201911082067.3 filed with CNIPA on Nov. 7, 2019, the disclosure of which is incorporated herein by reference in its entirety.

TECHNICAL FIELD

The present disclosure relates to the field of transmission and distribution of a power system, and particularly, to a control strategy suitable for a parallel MMC unit of a LCC-MMC hybrid cascade converter station.

BACKGROUND

Due to inverse distribution of energy resources and load requirements in China, long-distance high-capacity ultra-high voltage direct-current transmission is being rapidly developed. Currently, the direct current system for "the west-east power transmission project and the north-south power transmission project" in China has three characteristics: (1) the power flow direction is fixed; the power flow generally flows from an energy concentration area to a load concentration area, and power flow reversal generally does not need to be considered; (2) the voltage level is high, and the transmission power is high; the rated direct current voltage and the rated direct current power of the current extra-high voltage direct current transmission system can reach ±800 kV/8000 MW or higher; (3) in most cases, the overhead line is used as the direct current line; the overhead line has a higher fault rate than the cable, and the current converter is required to have a direct-current fault self-clearing capacity.

There are mainly two technical routes for current converters for the high voltage direct-current transmission system: a conventional direct-current transmission system based on a Line Coordinated Converter (LCC) and a flexible direct-current transmission system based on a Modular Multilevel Converter (MMC). Practical engineering experience and theoretical analysis indicate that LCC has several technical drawbacks: (1) a large number of filters and reactive power compensation devices are required to be disposed in the converter station, so that the occupied area of the converter station is too large, and overvoltage during load shedding can be caused; (2) a passive network cannot be powered; (3) the requirement on the strength of an alternating-current system is high, the alternating-current system is sensitive to alternating-current faults, and phase change failure faults are easy to occur under the alternating-current side faults; the defects jointly restrict the further development of the traditional direct current transmission technology. Compared with the LCC, the MMC uses a semiconductor device with active turn-on and turn-off capability, does not need to change phases by means of a power grid, can implement decoupling control of active power and reactive power, and provides voltage support for an alternating-current power grid, thereby fundamentally solving the technical defects of phase change failure, incapability of accessing a weak alternating-current system and the like in the conventional direct-current transmission technology and low economic efficiency.

In order to fully exert the technical advantages of the LCC and the MMC, a topological structure that a traditional direct-current converter station based on LCC is used on a rectifier side, an LCC-MMC hybrid cascade converter station is used on an inverter side, the rectifier side fully utilizes the advantages of high technical maturity and good economic efficiency of the LCC, the inverter side can achieve active and reactive independent control, the direct-current fault self-clearing capability, no cutoff under the serious fault of the rectifier side and the like.

In order to match a direct current of a sending end LCC converter station (rated at 6 kA or higher), a receiving end converter station usually needs a plurality of MMC units connected in parallel, because a maximum rated direct current of a single MMC unit can only reach around 3 kA in the related art. When a inverter station has a condition that a plurality of MMC units are connected in parallel, because the inverter station usually uses the constant direct-current voltage control manner, if more than one MMC unit uses the constant direct-current voltage control manner, the current distribution of the direct-current between the MMC units using the constant direct-current voltage control manner can be affected by the MMC direct-current impedance, and direct-current distribution is usually considered by the MMC units connected in parallel in consideration of the possible difference of parameters of each MMC.

So far, most of the published documents have basically focused on the research of the basic control strategy of the LCC-MMC hybrid cascade converter station, and the research includes steady-state control and fault control; however, few documents are currently studied and no control strategy for parallel MMC units of a LCC-MMC hybrid cascade converter stations is provided.

SUMMARY

In view of the above, the present disclosure provides a control strategy suitable for a parallel MMC unit of a LCC-MMC hybrid cascade converter station, and the control method has the advantages of simple implementation, strong applicability and greater use value in engineering design.

A control strategy suitable for a parallel MMC unit of a LCC-MMC hybrid cascade converter station includes following steps:

(1) All MMC units connected in parallel in a MMC valve manifold of a converter station are numbered according to a control manner and a rated capacity of each MMC unit of the MMC units;

(2) for a MMC unit using a constant direct-current voltage control manner, a direct-current instruction value of the MMC unit is calculated according to a direct-current measurement value;

(3) for a MMC unit using a constant active power control manner, an active power instruction value of the MMC unit is calculated according to the rated capacity of the MMC unit and a direct-current instruction value of a system rectifier station;

(4) for the MMC unit using the constant direct-current voltage control manner, a direct-current voltage instruction value of the MMC unit is corrected by using the direct-current instruction value and the direct-current measurement value, and further the MMC unit is controlled according to the corrected direct-current voltage instruction value;

(5) for the MMC unit using the constant active power control manner, the MMC unit is controlled according to the active power instruction value.

Furthermore, a specific implementation process of the step (1) is as follows. Firstly, all MMC units in the MMC valve manifold are divided into two types, that is, MMC units controlled in the constant direct-current voltage control manner and counted to be $N_1$, and MMC units controlled in the constant active power control manner and counted to be $N_2$; and the MMC units controlled in the constant direct-current voltage control manner are numbered from 1 to $N_1$ according to an order of rated capacities from small to large, and the MMC units controlled by the constant active power are numbered from $N_1+1$ to $N_1+N_2$ according to an order of rated capacities from small to large.

Furthermore, in the step (2), the direct-current instruction value of the MMC unit is calculated by using a following formula:

$$i_{dcref\_k} = \frac{S_k}{i_{dcba\_k} \sum_{i=1}^{N_1} S_i} \sum_{i=1}^{N_1} (i_{dci} \cdot i_{dcba\_i})$$

where $i_{dcref\_k}$ is a direct-current instruction value (p.u.) of a k-th MMC unit in the MMC valve manifold, $S_k$ is a rated capacity of the k-th MMC unit, $S_i$ is a rated capacity of an i-th MMC unit, $i_{dci}$ and $i_{dcba\_i}$ are a direct-current measured value (p.u.) and a direct-current reference value of the i-th MMC unit respectively, $i_{dcba\_k}$ is a direct-current reference value of the k-th MMC unit, i and k are natural numbers, $1 \leq i \leq N_1$, $1 \leq k \leq N_1$, and $N_1$ is a number of MMC units controlled in the constant direct-current voltage control manner in the MMC valve manifold.

Furthermore, in the step (3), the direct-current instruction value of the MMC unit is calculated by using a following formula:

$$P_{ref\_r} = \frac{S_r}{i_{dcba\_r} \sum_{j=1}^{N_1+N_2} S_j} i_{ba\_rec} \cdot i_{ref\_rec}$$

where $P_{ref\_r}$ is an active power instruction value (p.u.) of an r-th MMC unit in the MMC valve manifold, $i_{ba\_rec}$ and $i_{ref\_rec}$ are a direct-current instruction value (p.u.) and a direct-current reference value of a rectifier station respectively, $S_r$ is a rated capacity of the r-th MMC unit, $S_j$ is a rated capacity of a j-th MMC unit, $i_{dcba\_r}$ is a direct-current reference value of the r-th MMC unit, $N_1$ is a number of MMC units controlled in the constant direct-current voltage control manner in the MMC valve manifold, $N_2$ is a number of MMC units controlled in the constant active power control manner in the MMC manifold, r and j are natural numbers, $1 \leq j \leq N_1+N_2$, and $N_1+1 \leq r \leq N_1+N_2$.

Furthermore, a specific implementation process of the step (4) is as follows. firstly, a direct-current instruction value $i_{dcref\_k}$ is subtracted from a direct-current measurement value $i_{dck}$ of a k-th MMC unit to obtain a corresponding current error value; then, the current error value is introduced into a proportional control stage and an amplitude limiting stage in turn to obtain a direct-current voltage correct value of the k-th MMC unit; and finally, the direct-current voltage correct value is added to an original direct-current voltage instruction value of the k-th MMC unit to obtain a corrected direct-current voltage instruction value, and the k-th MMC unit is controlled according to the corrected direct-current voltage instruction value, where $1 \leq k \leq N_1$, and $N_1$ is a number of MMC units controlled in the constant direct-current voltage control manner in the MMC valve manifold.

Furthermore, a proportional coefficient of the proportional control stage is set to 0.1, and a maximum output limit value and a minimum output limit value of the amplitude limiting stage are set to 0.1 p.u. (per unit) and −0.1 p.u. respectively.

Based on the above, the present disclosure has the following beneficial technical effects:

(1) For the LCC-MMC hybrid cascade converter station, the control strategy can implement a function of simultaneously controlling a direct-current voltage by a plurality of MMC units, and can play a certain guiding role for future engineering design.

(2) According to the control strategy, active power of a MMC unit for controlling active power is calculated, and a direct-current voltage instruction value correction link is added in a constant direct-current voltage MMC unit, so that a direct-current can be reasonably distributed among parallel MMC units.

The method is simple to implement, high in applicability and significant in practical engineering significance.

DETAILED DESCRIPTION

In order to describe the present disclosure more specifically, the following detailed description of the present disclosure is made with reference to the accompanying drawings and the detailed description of the present disclosure.

Figure 2:
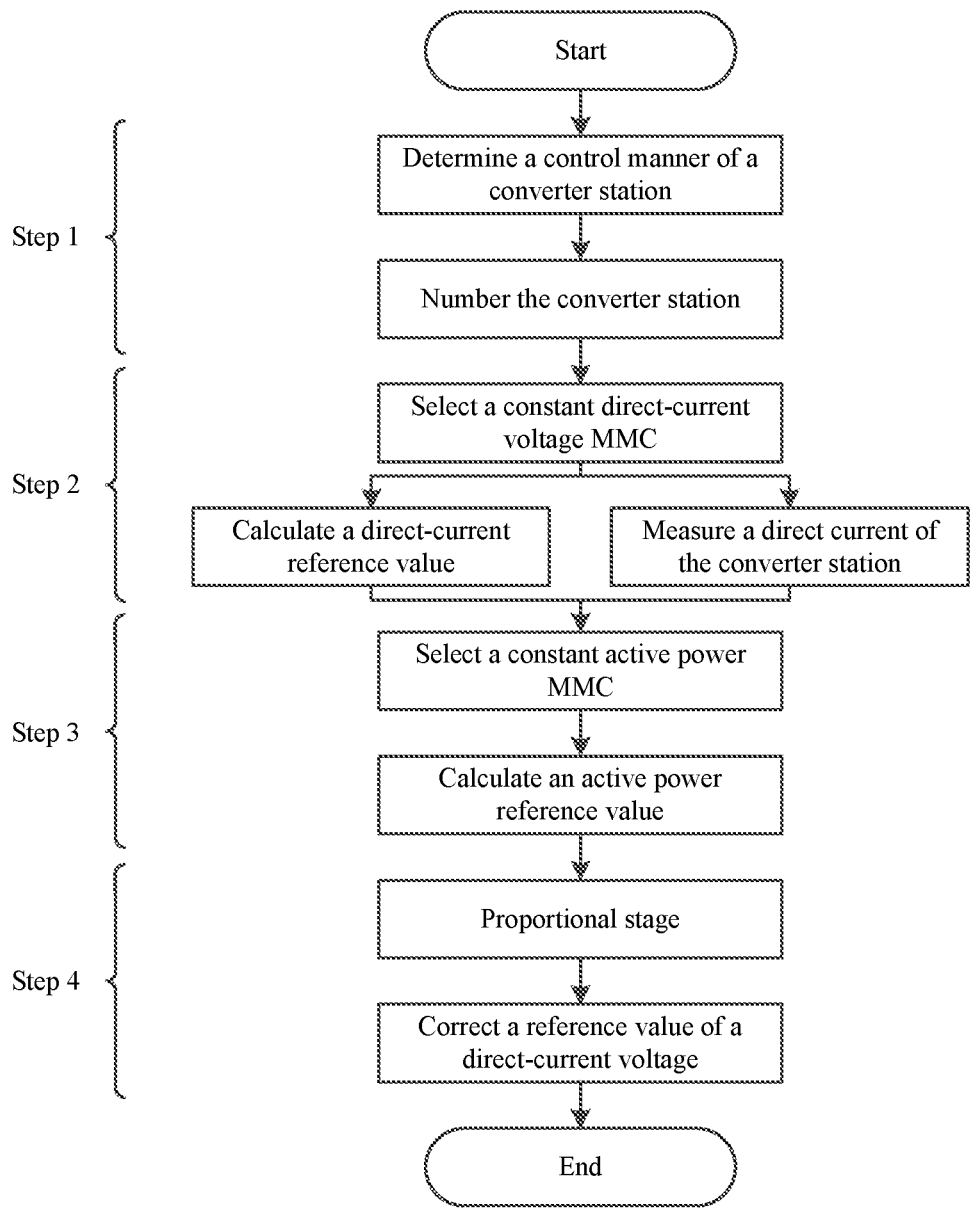
FIG. 2 is a flowchart of steps of a control method according to the present disclosure.

As shown in FIG. 2, a control strategy suitable for a parallel MMC unit of a LCC-MMC hybrid cascade converter station according to the present disclosure includes following steps.

(1) All MMC units connected in parallel in a MMC valve manifold of a converter station are numbered according to a control manner and a rated capacity of each MMC unit of the MMC units.

Supposing that $N_1$ MMC units among parallel MMC units of an inverter station use a constant direct-current voltage control manner, and $N_2$ MMC units use a constant active power control manner, the $N_1$ MMC units controlled in the constant direct-current voltage control manner are numbered from 1 to $N_1$ according to an order of rated capacities from small to large, and the MMC units controlled by the constant active power are numbered from $N_1+1$ to $N_2+N_1$ according to an order of rated capacities from small to large.

(2) For a MMC unit using a constant direct-current voltage control manner, a direct-current instruction value of the MMC unit is calculated according to a direct-current measurement value.

Supposing that the parallel MMC units controlled by the constant direct-current voltage manner have rated capacities of $S_1$ to $S_{N1}$ respectively, a direct-current instruction value (p.u.) of a k-th MMC unit in the MMC valve manifold is calculated by using a following formula:

$$i_{dcref\_k} = \frac{S_k}{i_{dcba\_k} \sum_{i=1}^{N_1} S_i} \sum_{i=1}^{N_1} (i_{dci} \cdot i_{dcba\_i})$$

where, $i_{dci}$ and $i_{dcba\_i}$ are a direct-current measured value (p.u.) and a direct-current reference value of the i-th MMC unit respectively ($1 \le i \le N_1$).

(3) For a MMC unit using a constant active power control manner, an active power instruction value of the MMC unit is calculated according to the rated capacity of the MMC unit and a direct-current instruction value of a system rectifier station.

Supposing that N2 parallel MMC units controlled by the constant direct-current voltage manner have rated capacities of $S_{N1}$ to $S_{(N1+N2)}$ respectively, an active power instruction value Pref_r (p.u.) of an r-th ($N_1 \le r \le N_2+N_1$) MMC unit in the MMC valve manifold is calculated by using a following formula:

$$P_{ref\_r} = \frac{S_r}{i_{dcba\_r} \sum_{j=1}^{N_1+N_2} S_j} i_{ba\_rec} \cdot i_{ref\_rec}$$

where $i_{ba\_rec}$ and $i_{ref\_rec}$ are a direct-current instruction value (p.u.) and a direct-current reference value of a rectifier station respectively, $S_i$ is a rated capacity of the i-th MMC unit ($1 \le i \le N_1+N_2$), $i_{dcba\_r}$ is a direct-current reference value of the r-th MMC unit ($N_1+1 \le r \le N_1+N_2$).

(4) For the MMC unit using the constant direct-current voltage control manner, a direct-current voltage instruction value of the MMC unit is corrected by using the direct-current instruction value and the direct-current measurement value, and the MMC unit is controlled according to the corrected direct-current voltage instruction value; and for the MMC unit using the constant active power control manner, the MMC unit is controlled according to the active power instruction value calculated in step (3).

Figure 3:
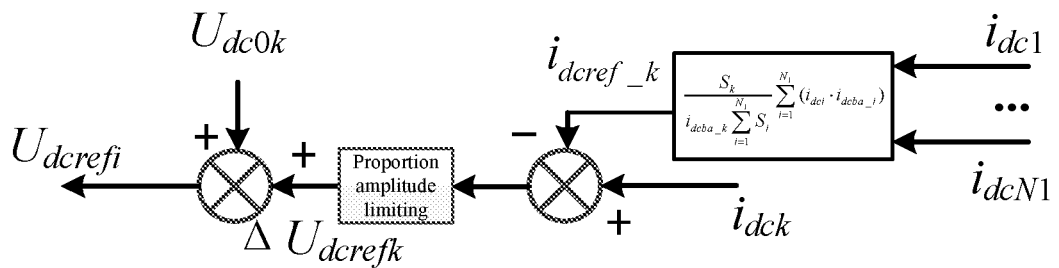
FIG. 3 is a block diagram of calculation principle of a direct-current voltage instruction value of an MMC unit using a constant direct-current voltage control manner.

As shown in FIG. 3, a direct-current instruction value $i_{dcref\_k}$ is subtracted from a direct-current measurement value $i_{dck}$ of a k-th ($1 \le k \le N_1$) MMC unit to obtain a corresponding current error value; the current error value is introduced into a proportional control stage and an amplitude limiting stage in turn to obtain a direct-current voltage correct value $\Delta U_{dcrefk}$ of the k-th MMC unit; the direct-current voltage correct value is added to an original direct-current voltage instruction value $U_{dc0k}$ (p.u.) of the k-th MMC unit to obtain a corrected direct-current voltage instruction value $U_{dcrefi}$ (p.u.).

Preferably, a proportional coefficient of the proportional control stage is set to 0.1, and a maximum output limit value and a minimum output limit value of the amplitude limiting stage are set to 0.1 p.u. and −0.1 p.u. respectively.

Figure 1A:
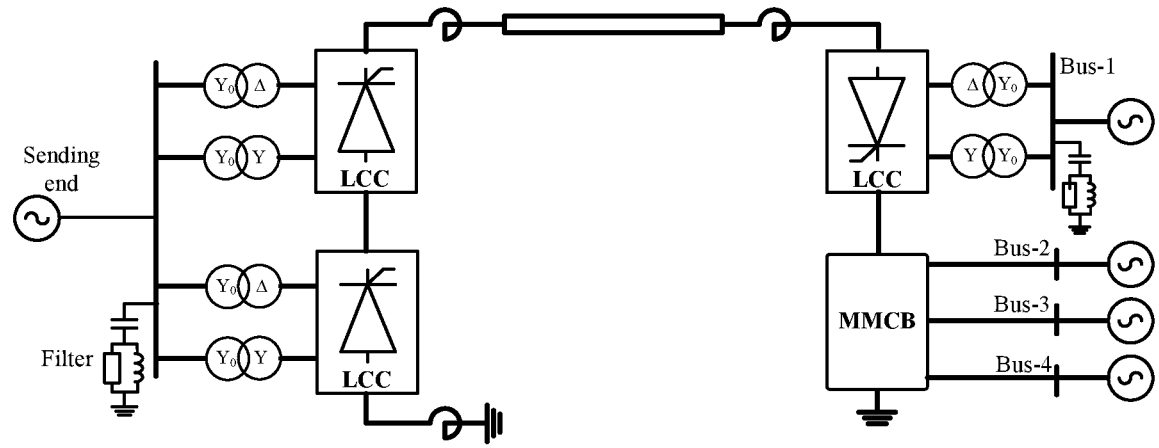
FIG. 1A is a structural diagram of a power transmission system in which an LCC converter station is used on a rectifier side and an LCC-MMC hybrid cascade converter station is used on an inverter side according to the present disclosure.
Figure 1B:
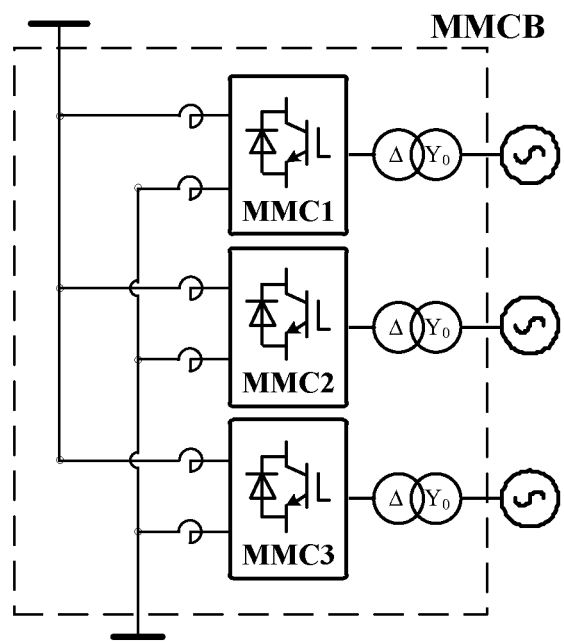
FIG. 1B is a structural diagram of a MMC valve manifold on an inverter side a system according to the present disclosure.

A structure of a direct-current transmission system according to this embodiment is as shown in FIG. 1A, where the rectifier station is constituted by using two 12-pulsating LCCs, and a high voltage valve bank of an inverter station is constituted by using a 12-pulsating LCC, and a low voltage valve bank uses three MMC units connected in parallel to constitute a MMC valve Bank (MMCB), as shown in FIG. 1B, all devices are controlled in the constant direct-current voltage control manner, and parameters of the direct-current transmission system are as shown in Table 1:

TABLE 1

| Type | Parameter Name | Value Rectifier side | Inverter side |
|---|---|---|---|
| Basic Parameters | Rated capacity (MW) | 5000 | 4750 |
| | Rated direct-current voltage (kV) | 800 | 760 |
| | Rated direct current (kA) | 6.25 | 6.25 |
| | LCC direct-current voltage (kV) | 800 | 380 |
| | MMC direct-current voltage (kV) | | 380 |
| | Active value of alternating-current voltage system voltage (kV) | 500 | 500 |
| MMC Parameters | Rated capacity (MW) | 833 | |
| | Number of bridge arm HBSMs | 182 | |
| | Capacitance in a HBSM (mF) | 15 | |
| | Bridge arm reactance (mH) | 55 | |
| Transformer parameters | LCC connection transformer | Winding type | Y0/Y |
| | | Transformation ratio/(kV/kV) | Rectifier side: 500/175 Inverter side: 500/162 |
| | | Capacity/MVA | 1500 |
| | MMC connection transformer | Winding type | Y0/Δ |
| | | Transformation ratio/(kV/kV) | 500/200 |
| | | Capacity/MVA | 1000 |
| Direct-current line parameters | Line length/km | 2100 | |
| | Resistance/Ω | 6.4 | |
| | Inductance/mH | 1620 | |

Figure 4:
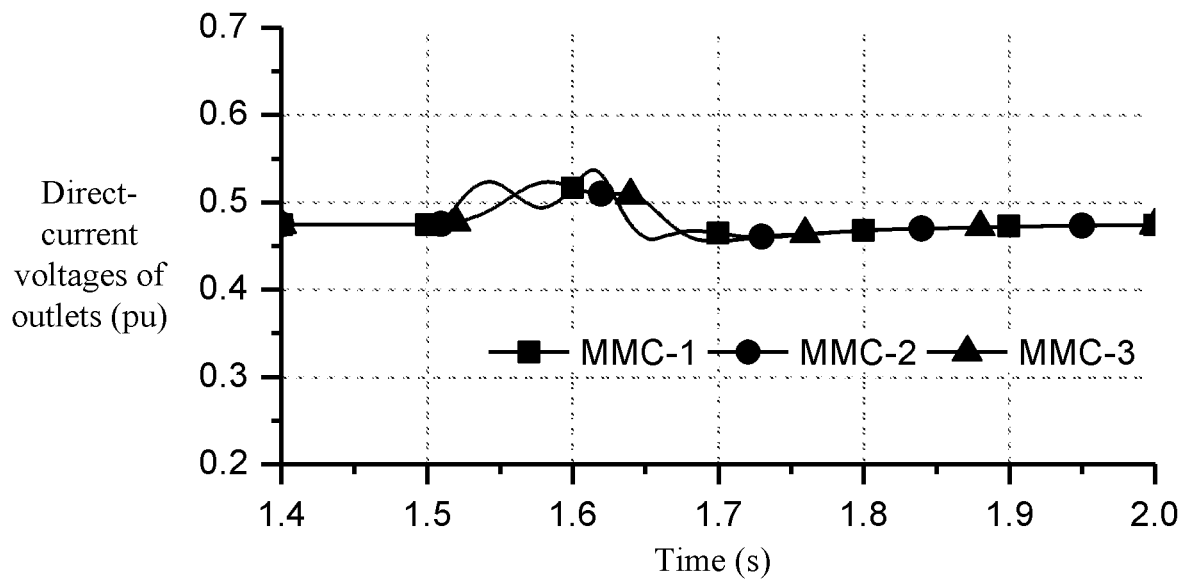
FIG. 4 is a simulation waveform diagram of direct-current voltages of outlets of MMC units obtained by simulation using a method of the present disclosure.
Figure 5:
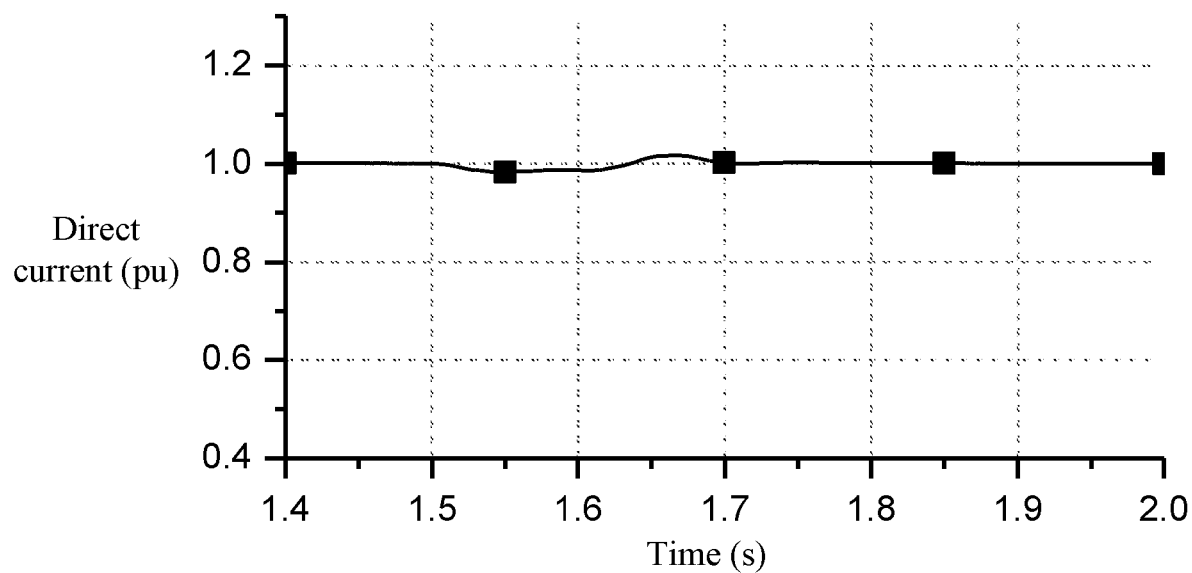
FIG. 5 is a simulation waveform diagram of a direct current of an inverter station obtained by simulation using a method of the present disclosure.
Figure 6:
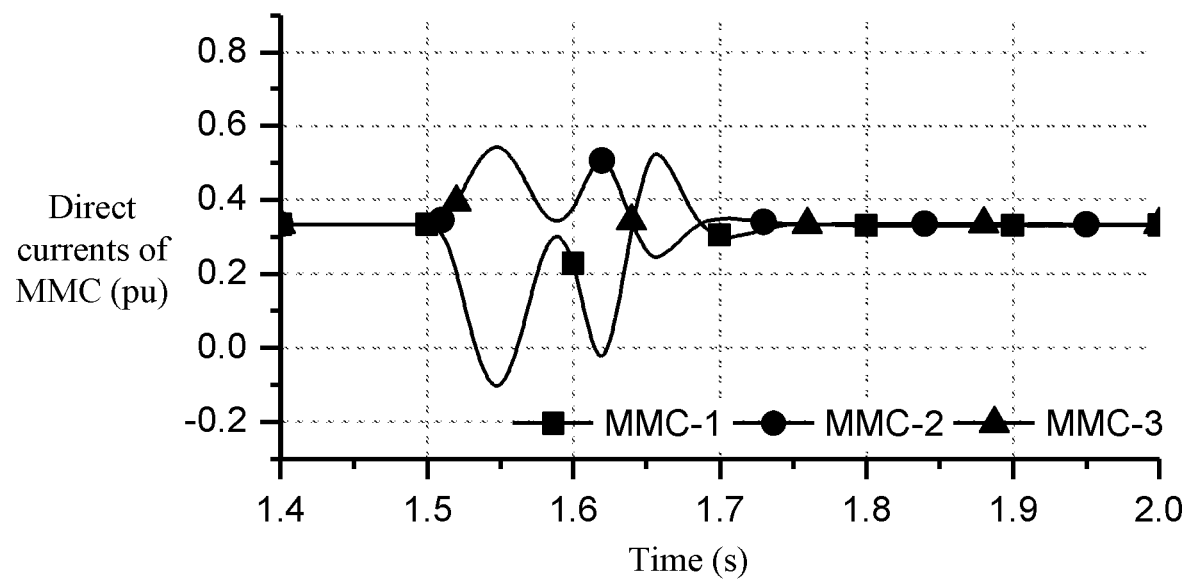
FIG. 6 is a simulation waveform diagram of direct currents of MMC units obtained by simulation using a method of the present disclosure.

A corresponding simulation platform is built in the electromagnetic transient simulation software PSCAD/EMTDC, and the three-phase metallic short-circuit fault of Bus-2 is simulated on the platform. In the simulation, it is assumed that a 1.5 s failure occurs in 1.5 seconds and the failure lasts 0.1 seconds. FIG. 4 shows waveforms of direct-current voltages of 3 parallel MMC units, FIG. 5 shows a waveform of a direct current of an inverter station, FIG. 6 shows waveforms of direct currents of 3 parallel MMC units, and simulation results prove effectiveness of the present disclosure.

What is claimed is:

1. A control method for a parallel Modular Multilevel Converter (MMC) unit of a Line Commutated Converter (LCC)-MMC hybrid cascade converter station, comprising following steps:
   (1) numbering all MMC units connected in parallel in a MMC valve manifold of the LCC-MMC hybrid cascade converter station according to a control manner and a rated capacity of each MMC unit of the MMC units, wherein a specific implementation process of the step (1) is as follows: firstly, dividing all MMC units in the MMC valve manifold into two types, that is, MMC units controlled in the constant direct-current voltage control manner and counted to be $N_1$, and MMC units controlled in the constant active power control manner and counted to be $N_2$; and numbering the MMC units controlled in the constant direct-current voltage control manner from 1 to $N_1$ according to an order of rated capacities from small to large, and numbering the MMC units controlled by the constant active power from $N_1+1$ to $N_1+N_2$ according to an order of rated capacities from small to large;
   (2) in a case where a MMC unit of the all MMC units connected in parallel uses a constant direct-current voltage control manner, calculating a direct-current instruction value of the MMC unit according to a direct-current measurement value;
   (3) in a case where a MMC unit of the all MMC units connected in parallel uses a constant active power control manner, calculating an active power instruction value of the MMC unit according to the rated capacity of the MMC unit and a direct-current instruction value of a system rectifier station;
   (4) in a case where the MMC unit of the all MMC units connected in parallel uses the constant direct-current voltage control manner, correcting a direct-current voltage instruction value of the MMC unit by using the direct-current instruction value and the direct-current measurement value, and further controlling the MMC unit according to the corrected direct-current voltage instruction value; and
   (5) in a case where the MMC unit of the all MMC units connected in parallel uses the constant active power control manner, controlling the MMC unit according to the active power instruction value.

2. The control method of claim 1, wherein in the step (2), the direct-current instruction value of the MMC unit is calculated by using a following formula:

$$i_{dcref\_k} = \frac{S_k}{i_{dcba\_k} \sum_{i=1}^{N_1} S_i} \sum_{i=1}^{N_1}(i_{dci} \cdot i_{dcba\_i})$$

wherein $i_{dcref\_k}$ is a direct-current instruction value of a k-th MMC unit in the MMC valve manifold, $S_k$ is a rated capacity of the k-th MMC unit, $S_i$ is a rated capacity of an i-th MMC unit, $i_{dci}$ and $i_{dcba\_i}$ are a direct-current measured value and a direct-current reference value of the i-th MMC unit respectively, $i_{dcba\_k}$ is a direct-current reference value of the k-th MMC unit, i and k are natural numbers, $1 \leq i \leq N_1$, $1 \leq k \leq N_1$, and $N_1$ is a number of MMC units controlled in the constant direct-current voltage control manner in the MMC valve manifold.

3. The control method of claim 1, wherein in the step (3), the active power instruction value of the MMC unit is calculated by using a following formula;

$$P_{ref\_r} = \frac{S_r}{i_{dcba\_r} \sum_{j=1}^{N_1+N_2} S_j} i_{ba\_rec} \cdot i_{ref\_rec}$$

wherein $P_{ref\_r}$ is an active power instruction value of an r-th MMC unit in the MMC valve manifold, $i_{ba\_rec}$ and $i_{ref\_rec}$ are a direct-current instruction value and a direct-current reference value of a rectifier station respectively, $S_r$ is a rated capacity of the r-th MMC unit, $S_j$ is a rated capacity of a j-th MMC unit, $i_{dcba\_r}$ is a direct-current reference value of the r-th MMC unit, $N_1$ is a number of MMC units controlled in the constant direct-current voltage control manner in the MMC valve manifold, $N_2$ is a number of MMC units controlled in the constant active power control manner in the MMC manifold, r and j are natural numbers, $1 \leq j \leq N_1+N_2$, and $N_1+1 \leq r \leq N_1+N_2$.

4. The control method of claim 1, wherein a specific implementation process of the step (4) is as follows: firstly, subtracting a direct-current instruction value $i_{dcref\_k}$ from a direct-current measurement value $i_{dck}$ of a k-th MMC unit to obtain a corresponding current error value; then, introducing the current error value into a proportional control stage and an amplitude limiting stage in turn to obtain a direct-current voltage correct value of the k-th MMC unit; and finally, adding the direct-current voltage correct value to an original direct-current voltage instruction value of the k-th MMC unit to obtain a corrected direct-current voltage instruction value, and controlling the k-th MMC unit in the constant direct-current voltage control manner according to the corrected direct-current voltage instruction value, wherein $1 \leq k \leq N_1$, and $N_1$ is a number of MMC units controlled in the constant direct-current voltage control manner in the MMC valve manifold.

5. The control method of claim 4, wherein a proportional coefficient of the proportional control stage is set to 0.1, and a maximum output limit value and a minimum output limit value of the amplitude limiting stage are set to 0.1 p.u. and −0.1 p.u. respectively.

6. The control method of claim 1, wherein according to the control strategy, active power of a MMC unit for controlling active power is calculated, and a direct-current voltage instruction value correction stage is added in a constant direct-current voltage MMC unit, a direct-current is reasonably distributed in the MMC units connected in parallel.

* * * * *